US012657555B2

(12) United States Patent
Seck

(10) Patent No.: US 12,657,555 B2
(45) Date of Patent: Jun. 16, 2026

(54) SYSTEMS AND METHODS FOR MULTIPARTITE RELAY PROTOCOLS

(71) Applicant: Capital One Services, LLC, McLean, VA (US)

(72) Inventor: Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 108 days.

(21) Appl. No.: 18/541,212

(22) Filed: Dec. 15, 2023

(65) Prior Publication Data

US 2025/0200533 A1    Jun. 19, 2025

(51) Int. Cl.
*G06Q 20/02* (2012.01)

(52) U.S. Cl.
CPC ......... *G06Q 20/027* (2013.01); *G06Q 20/023* (2013.01)

(58) Field of Classification Search
CPC ............................ G06Q 20/027; G06Q 20/023
USPC .......................................................... 705/79
See application file for complete search history.

(56) References Cited

U.S. PATENT DOCUMENTS

| | | |
|---|---|---|
| 5,953,710 A | 9/1999 | Fleming |
| 7,225,155 B1 | 5/2007 | Polk |

| | | | | |
|---|---|---|---|---|
| 11,334,579 | B1 * | 5/2022 | Quade | ................... G06Q 40/12 |
| 11,568,481 | B1 * | 1/2023 | Lash | ...................... G06Q 40/03 |
| 12,067,219 | B2 * | 8/2024 | Pastore | ................. G06Q 40/03 |
| 2020/0364690 | A1 | 11/2020 | Brazier, III | |
| 2021/0398141 | A1 * | 12/2021 | Benkreira | ............. H04W 12/72 |
| 2022/0027870 | A1 * | 1/2022 | Crane | ..................... G06F 9/541 |
| 2022/0172294 | A1 * | 6/2022 | Irwin | ..................... G06Q 10/10 |
| 2022/0277290 | A1 * | 9/2022 | Roongta | ............ G06Q 20/4014 |
| 2023/0214906 | A1 * | 7/2023 | Chau | ................. G06Q 30/0601 |
| | | | | 705/26.81 |

* cited by examiner

*Primary Examiner* — Courtney P Jones
(74) *Attorney, Agent, or Firm* — Bookoff McAndrews, PLLC

(57)    ABSTRACT

A method for multipartite relay may include receiving, from a multipartite relay system, a multipartite relay request. The multipartite relay request may include relay data. The relay data may include a single relay amount and an allocation policy. The method may further include requesting a relay of the single relay amount. The method may further include receiving the relay of the single relay amount. The method may further include, in response to receiving the relay of the single relay amount, splitting the single relay amount into a first apportioned amount and a second apportioned amount according to the allocation policy of the multipartite relay request. The method may further include transmitting the first apportioned amount into a first recipient system of a first recipient and the second apportioned amount into a second recipient system of a second recipient.

20 Claims, 7 Drawing Sheets

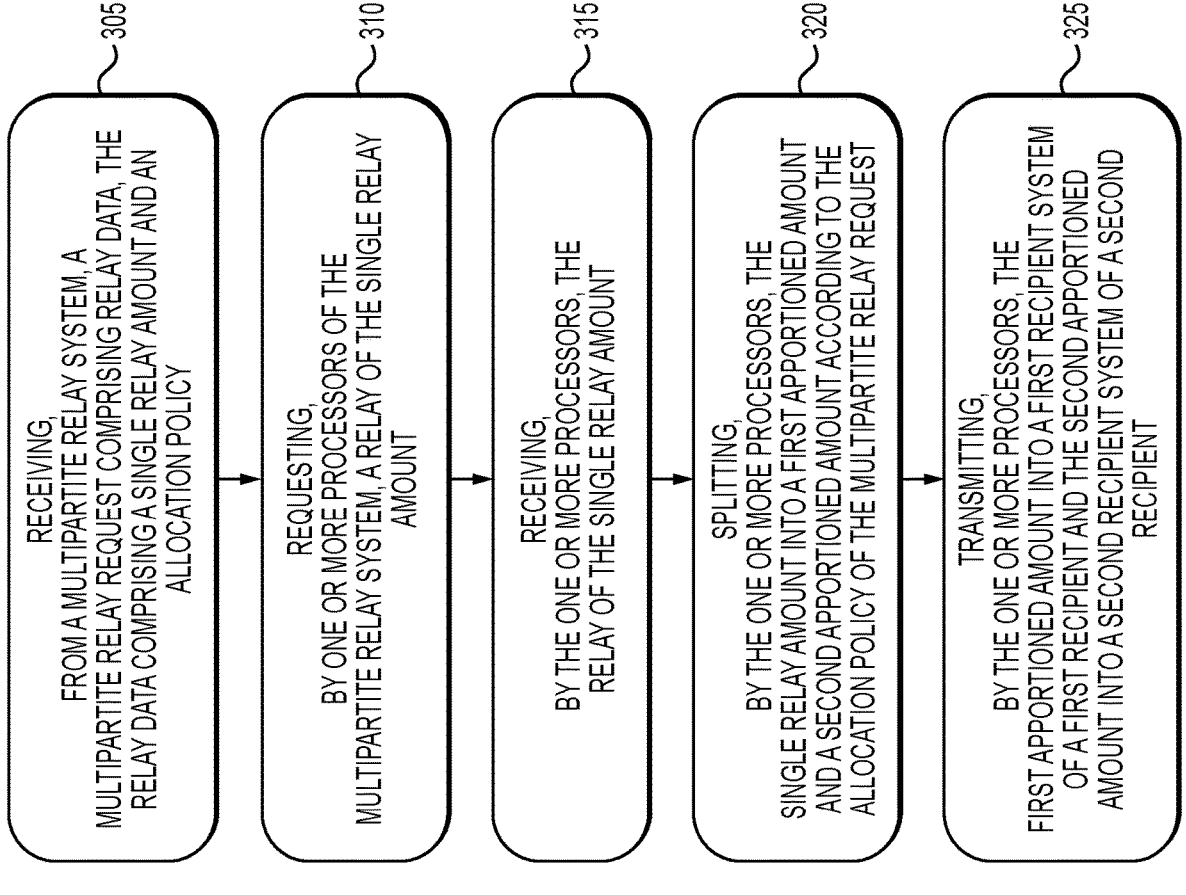

300

RECEIVING,
FROM A MULTIPARTITE RELAY SYSTEM, A
MULTIPARTITE RELAY REQUEST COMPRISING RELAY DATA, THE
RELAY DATA COMPRISING A SINGLE RELAY AMOUNT AND AN
ALLOCATION POLICY

305

REQUESTING,
BY ONE OR MORE PROCESSORS OF THE
MULTIPARTITE RELAY SYSTEM, A RELAY OF THE SINGLE RELAY
AMOUNT

310

RECEIVING,
BY THE ONE OR MORE PROCESSORS, THE
RELAY OF THE SINGLE RELAY AMOUNT

315

SPLITTING,
BY THE ONE OR MORE PROCESSORS, THE
SINGLE RELAY AMOUNT INTO A FIRST APPORTIONED AMOUNT
AND A SECOND APPORTIONED AMOUNT ACCORDING TO THE
ALLOCATION POLICY OF THE MULTIPARTITE RELAY REQUEST

320

TRANSMITTING,
BY THE ONE OR MORE PROCESSORS, THE
FIRST APPORTIONED AMOUNT INTO A FIRST RECIPIENT SYSTEM
OF A FIRST RECIPIENT AND THE SECOND APPORTIONED
AMOUNT INTO A SECOND RECIPIENT SYSTEM OF A SECOND
RECIPIENT

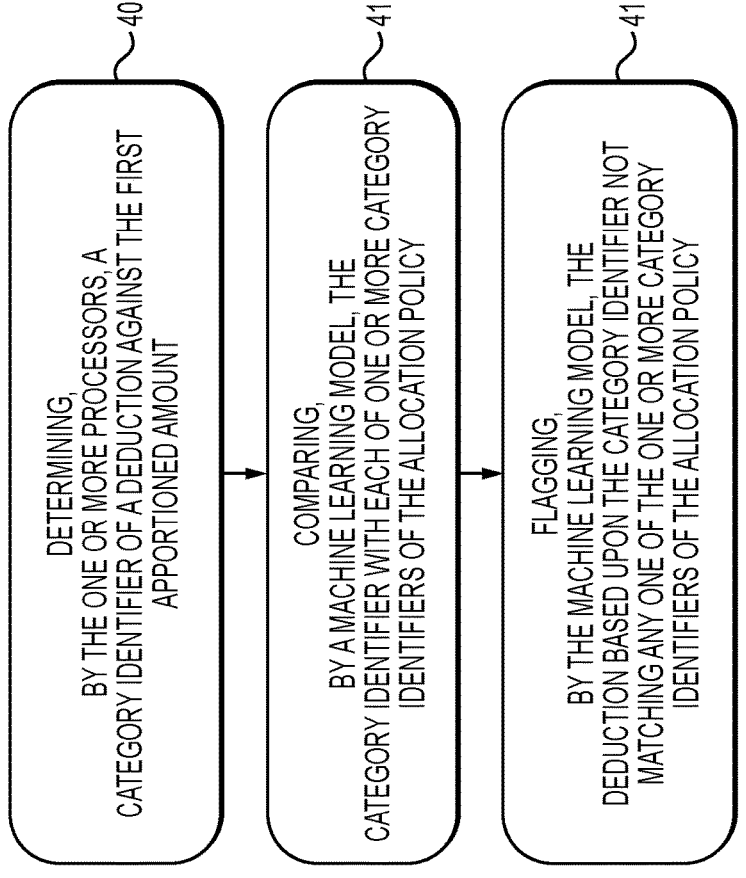

405

DETERMINING,
BY THE ONE OR MORE PROCESSORS, A
CATEGORY IDENTIFIER OF A DEDUCTION AGAINST THE FIRST
APPORTIONED AMOUNT

410

COMPARING,
BY A MACHINE LEARNING MODEL, THE
CATEGORY IDENTIFIER WITH EACH OF ONE OR MORE CATEGORY
IDENTIFIERS OF THE ALLOCATION POLICY

415

FLAGGING,
BY THE MACHINE LEARNING MODEL, THE
DEDUCTION BASED UPON THE CATEGORY IDENTIFIER NOT
MATCHING ANY ONE OF THE ONE OR MORE CATEGORY
IDENTIFIERS OF THE ALLOCATION POLICY

*FIG. 4*

400

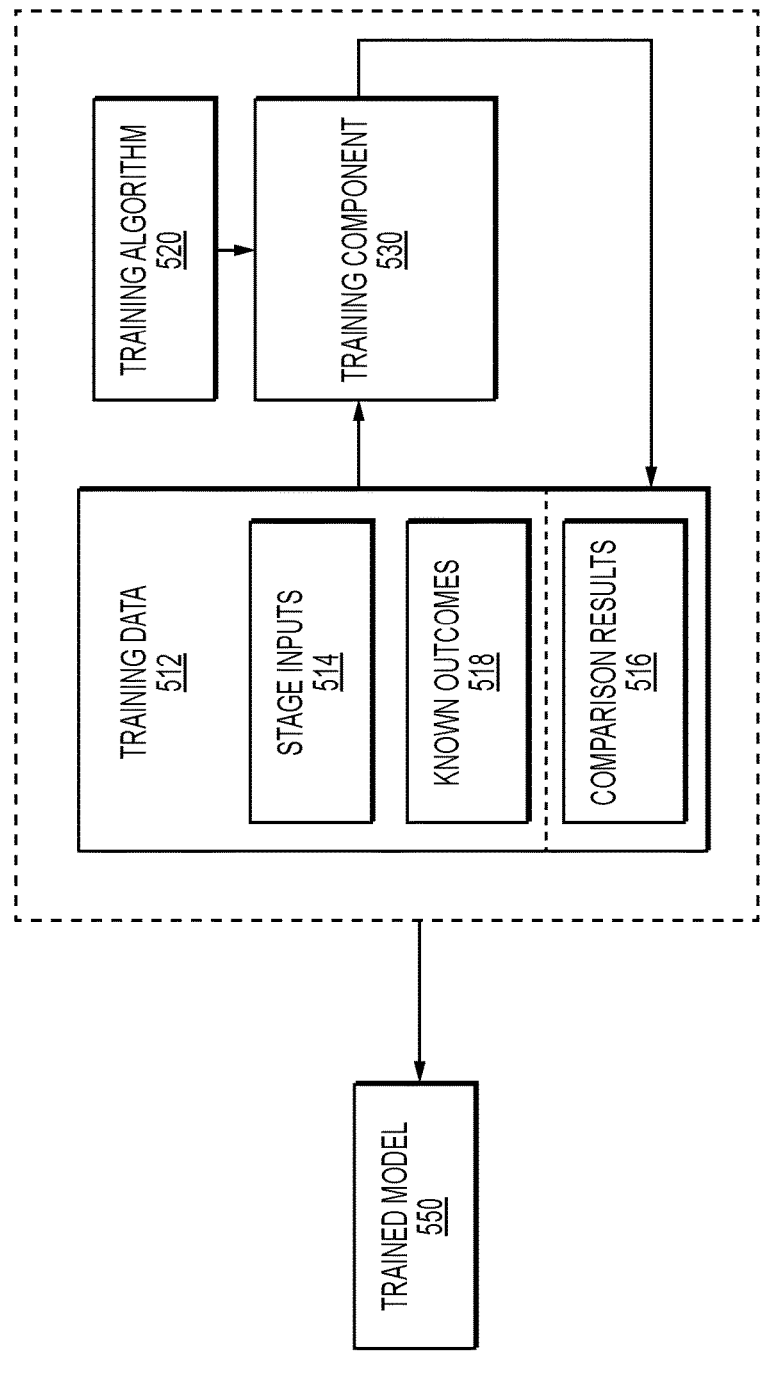
*FIG. 5*

DISPLAY 610

USER INPUT/OUTPUT DEVICE 612

COMMUNICATION INTERFACE 620

NETWORK 110

608

PROCESSOR 602

INSTRUCTIONS 624

MEMORY 604

INSTRUCTIONS 624

DRIVE UNIT 606

COMPUTER READABLE MEDIUM 622

INSTRUCTIONS 624

600

SYSTEMS AND METHODS FOR MULTIPARTITE RELAY PROTOCOLS

TECHNICAL FIELD

Various embodiments of this disclosure relate generally to protocols for transmitting a single relay amount to multiple recipients according to an allocation policy, and, more particularly, to systems and methods for multipartite relay.

BACKGROUND

Transferring money between individuals and entities (e.g. a business) is an integral part of daily life and business. Money may be transferred from one financial system (e.g. a bank) to another financial system via an electronic funds transfer (EFT) or the like. In other words, the funds may move through a payment network from an account (e.g. a bank account) of a sender to an account of a recipient. The funds moving through the payment network may include passing through an automated clearing house (ACH). The funds, moving through the payment network, may consist of a single amount to be transferred between a single sender and a single receiver. Therefore, an EFT is between two individuals or entities, a sender and a receiver.

In a case where a sender would like to transfer funds to multiple recipients, however, the sender must initiate a separate funds transfer, or EFT, for each respective recipient. In some cases, the sender may be responsible for a funds transfer fee for each funds transfer to each recipient. Current systems and methods do not allow for a funds transfer between more than a single sender and a single recipient. Therefore, a need exists for systems and methods of transferring, or relaying, funds from a single sender to more than one recipient via a single funds transfer.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for multipartite relay.

In one aspect, an exemplary embodiment of a method for multipartite relay may include receiving, from a multipartite relay system, a multipartite relay request. The multipartite relay request may include relay data. The relay data may include a single relay amount and an allocation policy. The method may further include requesting, by one or more processors of the multipartite relay system, a relay of the single relay amount. The method may further include receiving, by the one or more processors, the relay of the single relay amount. The method may further include, in response to receiving the relay of the single relay amount, splitting, by the one or more processors, the single relay amount into a first apportioned amount and a second apportioned amount according to the allocation policy of the multipartite relay request. The method may further include transmitting, by the one or more processors, the first apportioned amount into a first recipient system of a first recipient and the second apportioned amount into a second recipient system of a second recipient.

In another aspect, an exemplary embodiment of a method for multipartite relay may include receiving, from a multipartite relay system, a multipartite relay request. The multipartite relay may include relay data. The relay data may include a single relay amount and an allocation policy. The method may further include providing the multipartite relay request to an allocation machine-learning model trained by modifying one or more weights, layers, nodes, or synapses based on training data comprising historical allocation policies, historical relay amounts, and historical recipients. The method may further include receiving an allocation policy as an output of the allocation machine-learning model. The allocation policy may identify a first recipient and a second recipient. The method may further include requesting a relay of the single relay amount. The method may further include receiving the relay of the single relay amount at a recipient platform. The recipient platform may include a plurality of recipient systems. The relay may identify a first recipient system, of the plurality of recipient systems, associated with a first recipient. The relay may also identify a second recipient system, of the plurality of recipient systems, associated with a second recipient. The method may further include, in response to receiving the relay of the single relay amount, splitting the single relay amount into a first apportioned amount and a second apportioned amount according to the allocation policy of the multipartite relay request. The method may further include allocating the first apportioned amount into the first recipient system and the second apportioned amount into the second recipient system.

In a further aspect, an exemplary embodiment of a system for multipartite relay may include a memory storing instructions and a processor operatively connected to the memory and configured to execute the instruction to perform operations. The operations may include receiving, from the multipartite relay system, a multipartite relay request. The multipartite relay request may include relay data. The relay data may include a single relay amount and an allocation policy. The operations may further include requesting a relay of the single relay amount. The operations may further include receiving the relay of the single relay amount. The operations may further include, in response to receiving the relay of the single relay amount, splitting the single relay amount into a first apportioned amount and a second apportioned amount according to the allocation policy of the multipartite relay request. The operations may further include transmitting the first apportioned amount into a first recipient system of a first recipient and the second apportioned amount into a second recipient system of a second recipient.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

US 12,657,555 B2

3

Figure 2:
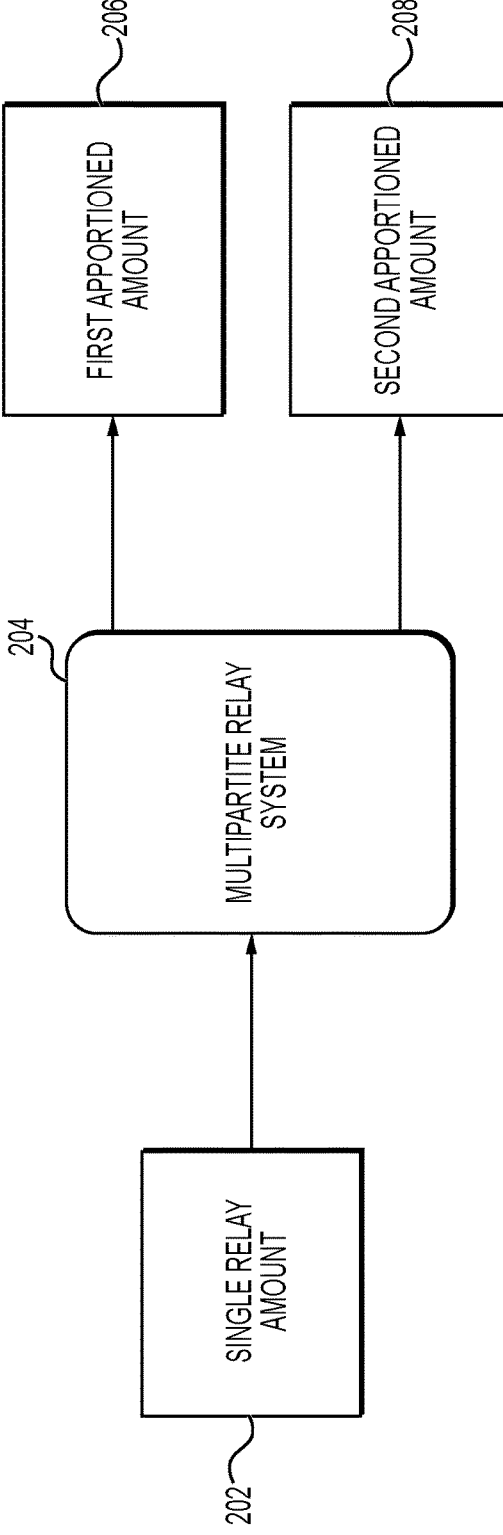

FIG. 2 depicts a diagram of a splitting of a single relay amount into apportioned amounts using the exemplary multipartite relay system, according to one or more embodiments.

FIG. 3 depicts a flowchart of an exemplary method of using the multipartite relay system, according to one or more embodiments.

FIG. 4 depicts a flowchart of another exemplary method of using the multipartite relay system, according to one or more embodiments.

FIG. 5 depicts a flow diagram for training a machine-learning model, according to one or more embodiments.

Figure 6:

FIG. 6 depicts an example of a computing device, according to one or more embodiments.

DETAILED DESCRIPTION OF EMBODIMENTS

According to certain aspects of the disclosure, methods and systems are disclosed for multipartite relay. In accordance with subject matter disclosed herein, individuals and/or entities may be able to electronically transfer funds between a single sender and more than one recipient using a multipartite relay protocol disclosed herein. In comparison to conventional systems, for example, the multipartite relay protocol may be implemented by using a partite module operationally triggered after a single transaction is performed at a transaction provider. For example, a single amount of funds that is transferred may be divided into multipartite apportioned amounts to be deposited into each recipient's account.

As will be discussed in more detail below, in various embodiments, systems and methods are described for multipartite relay via a post transaction protocol. In various embodiments machine-learning may be used to implement aspects of the multipartite relay system. By training an allocation machine learning model, an allocation policy may be generated and/or one or more recipients for allocation of a single relay amount may be identified. By training a comparison machine-learning model, e.g., via supervised or semi-supervised learning, to learn associations between category identifiers, e.g., categories of purchased items, and an allocation policy of a multipartite relay, the trained comparison machine-learning model may be usable to determine a match between a category of a purchased item and a category identifier of the allocation policy.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "guidance" or the like generally encompass one or more recommendations.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a multipartite relay system may automatically split a single relay amount into a first apportioned amount and a second apportioned amount according to an allocation policy of a multipartite relay request. In such examples, the multipartite relay system cause the single relay amount to be withdrawn from a sender system (e.g., as a single withdrawal transaction), may apply the allocation policy, and may transmit the first apportioned amount into a first recipient system of a first recipient and the second apportioned amount into a second recipient system of a second recipient.

In another exemplary use case, a machine-learning model may be trained to find associations between categories of purchased items and category identifiers of an allocation policy of a multipartite relay request in order to flag a purchase of an apportioned amount transmitted by a multipartite relay system.

While the examples above involve multipartite relay, it should be understood that techniques according to this disclosure may be adapted to any suitable type of transferring funds. It should also be understood that the examples above are illustrative only. The techniques and technologies of this disclosure may be adapted to any suitable activity.

Presented below are also various aspects of machine-learning techniques that may be adapted to multipartite relay. As will be discussed in more detail below, machine-learning techniques adapted to multipartite relay, may include one or more aspects according to this disclosure, e.g., finding associations between a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

Figure 1A:
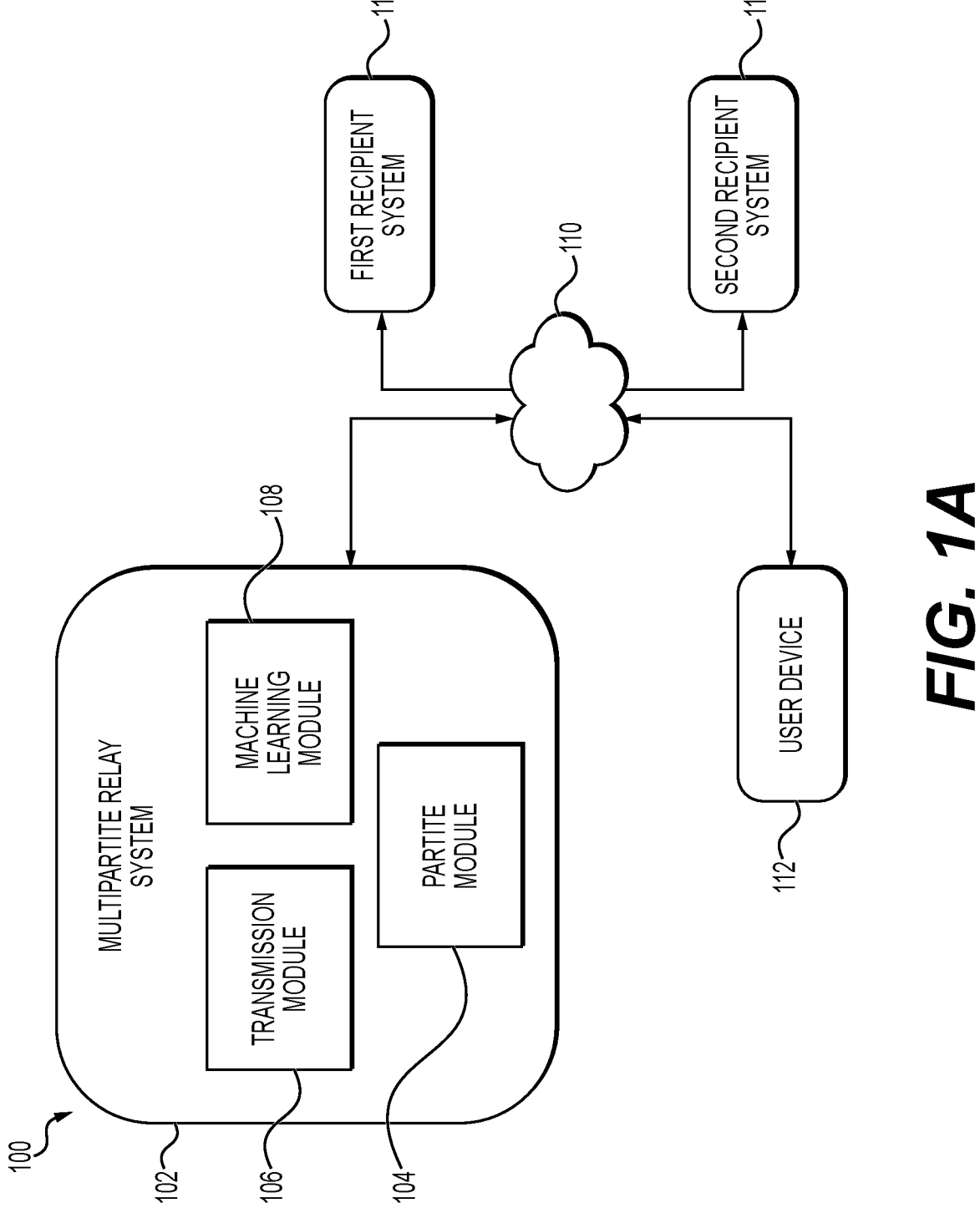
FIG. 1A depicts an exemplary environment for a multipartite relay system, according to one or more embodiments.

FIG. 1A depicts an exemplary environment 100 that may be utilized with techniques presented herein. One or more user device(s) 112 may communicate with one or more components via an electronic network 110. As will be discussed in further detail below, one or more multipartite relay system(s) 102 may communicate with one or more of the other components of the environment 100 across electronic network 110. The one or more user device(s) 112 may be associated with a user, e.g., a sender of a single relay amount and/or a user or automated software associated with inputting a multipartite relay request into user device 112, or a user or automated software associated with one or more of generating, training, or tuning a machine-learning model for multipartite relay, generating, obtaining, uploading, or analyzing transaction categories, and/or obtaining or analyzing purchase transactions. In addition, a first recipient system 114 and a second recipient system 116 may communicate with multipartite relay system(s) 102 across electronic network 110.

In some embodiments, a multipartite relay request may be transmitted from user device 112 to multipartite relay system 102. The multipartite relay request may include relay data, the relay data including a single relay amount (e.g. an amount of funds) to be drawn from a financial account of a sender. A first electronic signal may be generated by multipartite relay system 102 or other components of environment 100, based on the relay data, such that the first electronic signal causes the single relay amount to be drawn from the financial account of a sender (e.g., as a single transaction). The first electronic signal may be generated at a multipartite relay system 102 processor. The first electronic signal may be generated in a first format (e.g., a multipartite relay system 102 format) and may be converted into a second format (e.g., a format acceptable by a financial account processor). The first electronic signal may be converted from the first format to the second format by a component or module of the multipartite relay system 102 (e.g., transmission module 105, as further discussed herein). The relay data of the multipartite relay request may also include an allocation policy. In examples, the allocation policy is determined by and/or input by the sender/user, is determined and/or input by a software module (e.g., based on user provided rules, machine learning output rules, and/or predetermined policies). In some embodiments, multipartite relay system 102 may split the single relay amount according to the allocation policy. In such embodiments, a single EFT of the single relay amount may be allocated (e.g. credited) to more than one recipient (e.g. recipient account). In examples, the allocation policy may specify that the single relay amount be split into a first apportioned amount that is transmitted over electronic network 110 to first recipient system 114 and a second apportioned amount that is transmitted over electronic network 110 to second recipient system 116. A second electronic signal may be generated by multipartite relay system 102 or other components of environment 100, based on the allocation policy, such that the second electronic signal causes the single relay amount to be split based on the allocation policy. The second electronic signal may be generated at a multipartite relay system 102 processor or other system component processor. The second electronic signal may be generated in a first format (e.g., a multipartite relay system 102 format) and may be converted into a second format (e.g., a format acceptable by a component, such as partite module 104, recipient platform 115, first recipient system 114, and/or a second recipient system 116 further discussed herein, configured to split the single relay amount after being drawn from the financial account). While FIG. 1A illustrates two recipient systems (114, 116), it is to be understood that the single relay amount may be split and transmitted to more or less than two distinct recipient systems (e.g. one recipient system, three recipient systems, and the like).

In some embodiments, the components of the environment 100 are associated with a common entity, e.g., a financial service system, a third-party service, a financial institution, transaction processor, a bank, a credit card or debit card issuer, or the like. In some embodiments, one or more of the components of the environment is associated with a different entity than another. The systems and devices of the environment 100 may communicate in any arrangement. As will be discussed herein, systems and/or devices of the environment 100 may communicate in order to perform one or more of generating, training, or using a machine-learning model for multipartite relay, among other activities.

The user device(s) 112 may be configured to enable a user to access and/or interact with other systems in the environment 100. For example, the user device(s) 112 may be a computer system such as, for example, a desktop computer, a mobile device, a tablet, etc. In some embodiments, the user device(s) 112 may include one or more electronic application(s), e.g., a program, plugin, browser extension, software module, mobile application, etc., installed on a memory of the user device(s) 112. In some embodiments, the electronic application(s) may be associated with one or more of the other components in the environment 100. For example, the electronic application(s) may include one or more of system control software, system monitoring software, software development tools, etc. In some embodiments, at least a portion of multipartite relay system 102 may be implemented as a software module to run on user device(s) 112. In examples, a user (e.g. sender) may create or input a multipartite relay request into user device(s) 112 via a software module or the like, as described above.

In various embodiments, the environment 100 may further include a database. The database may include a server system and/or a data storage system such as computer-readable memory such as a hard drive, flash drive, disk, etc. In some embodiments, the database includes and/or interacts with an application programming interface for exchanging data to other systems, e.g., one or more of the other components of the environment. The database may include and/or act as a repository or source for storing multipartite relay requests, user data, transaction data (e.g. for use by a machine-learning model), metadata related to the single relay amount and/or the first and second apportioned amounts, such as a relay identifier or the like.

In various embodiments, the environment 100 may further include a first recipient system 114 and a second recipient system 116. In examples, first and second recipient systems may be financial systems (e.g. a bank), a financial account (e.g. a bank account, deposit account, spending card, an account managed by a financial services institution, or the like), an automated teller machine (ATM), a software module on a user device in electronic communication with multipartite relay system 102, or the like. As described above, first and second recipient systems are representative of one or more recipient systems that may be included within, or interactive with other components of, environment 100.

In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a world-wide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the multipartite relay systems(s) 102 may one or more of (i) generate, store, train, or use a machine-learning model configured for multipartite relay. The multipartite relay system(s) 102 may include or access one or more machine-learning models and/or instructions associated with the machine-learning models, e.g., instructions for generating a machine-learning model, training the machine-learning model, using the machine-learning model etc. For example, a comparison machine learning model may flag a transaction (e.g. a deduction or debit against an apportioned amount) based upon a category of the transaction (e.g. grocery, car maintenance, or the like) not matching any one of one or more category identifiers of an allocation policy of a multipartite relay request. A comparison machine learning model may be trained in accordance with techniques disclosed herein (e.g., by modifying one or more weights, layers, nodes, or synapses) based on training data that includes historical category identifiers, historical deductions, and/or historical matches. The comparison machine learning model may output an allocation policy or an update to an allocation policy.

In examples, a category identifier of the allocation policy may represent an approved category for transactions. The multipartite relay system(s) 102 may include training data, e.g., transactions, deductions, or debits from an apportioned amount credited to a recipient's account, and may include ground truth, e.g., (i) a category of a transaction, and (ii) one or more category identifiers of an allocation policy to flag the transaction.

As depicted in FIG. 1A, multipartite relay system(s) 102 may include partite module 104. In various embodiments, partite module 104 may be configured to split a single relay amount (e.g. a single EFT) into a first apportioned amount (e.g. a portion of the single EFT) and a second apportioned amount (e.g. another portion of the single EFT) according to an allocation policy of a multipartite relay request. In examples, the allocation policy may be included with/within a multipartite relay request as relay data. The allocation policy may identify or instruct how the single relay amount is to be divided or split by the partite module 104, among other data or instructions. As illustrated, multipartite relay system(s) 102 may also include transmission module 106. In various embodiments, transmission module 106 may be configured to transmit the first apportioned amount to a first recipient system of a first recipient and to likewise transmit the second apportioned amount into a second recipient system of a second recipient. In examples, the single relay amount may pass through an ACH system before being received by the multipartite relay system 102.

Accordingly, techniques and systems disclosed herein may be implemented such that a single relay amount is extracted from a sender system (e.g., based on a first signal) and, after such extraction, is apportioned based on an allocation policy. Such implementations provide a technical advantage of using limited computational resources and/or financial resources (e.g., transaction fees) at a sender's system. Such implementation further provides a technical advantage of implementing a protocol for applying an allocation policy to extracted funds (e.g., via a single extraction) such that the extracted funds can be diverted to two or more recipient systems that are independent of each other.

The following discusses one particular illustrative example of multipartite relay, an electronic funds transfer protocol that may be referred to as easy money transfer (EMT). In such an example, a sender (e.g. a user of the multipartite relay system(s) 102) may generate, create, or input a multipartite relay request using a user device, such as user device 112. The multipartite relay request that is input using user device 112 may be captured or received by multipartite relay system 102 using any method or components described herein. The multipartite relay request may include or access relay data, including at least a single relay amount and an allocation policy. The single relay amount may identify a total, single amount of funds (e.g. $1000) the sender requests to transfer. In turn, the allocation policy may identify how the single relay amount is to be split into one or more apportioned amounts, and may also identify the respective recipients for which each apportioned amount is intended. In the illustrative example, multipartite relay system 102 may initiate a single electronic funds transfer of the single relay amount, $1000, from an account of the sender (e.g. a bank account of the sender). The single relay amount is then split and transmitted according to the allocation policy. In the illustrative example, the allocation policy identifies that $600 of the $1000 is to be sent to a recipient A and $400 of the $1000 is to be sent to a recipient B. Partite module 104 may split the $1000 single relay amount and transmission module 106 may then transmit the apportioned amounts into two respective recipient systems of recipient A and recipient B, such as recipient systems 114 and 116. In such an example, therefore, the recipient system of recipient A may be credited $600 and the recipient system of recipient B may be credited $400.

In various embodiments, an allocation policy of a multipartite relay request may also include one or more categories, or category identifiers associated with one or more respective categories. In examples, the one or more category identifiers may identify an approved category for purchases made with the funds of an apportioned amount of the single relay amount. For example, a sender may include, with the multipartite relay request, instructions that the funds for a recipient are to be used for a specific category (e.g. for groceries or car repair, rather than entertainment). Therefore, data gathered from purchases made, or deductions against the apportioned amount may then be provided to machine-learning module 108 as input. In various embodiments, machine-learning module 108 may be configured to receive as input the training data for the machine-learning model as described herein. Machine-learning module 108 may also be configured to output the trained machine-learning model as will be described in further detail below.

In some embodiments, a system or device other than the multipartite relay system(s) 102 is used to generate and/or train the machine-learning model. For example, such a system may include instructions for generating the machine-learning model, the training data and ground truth, and/or instructions for training the machine-learning model. A resulting trained-machine-learning model may then be provided to and/or accessible by the multipartite relay system(s) 102.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between transaction data (e.g. purchases, debits, or the like) and category data, such that the trained machine-learning model is configured to flag a transaction in response to the input data based on the learned associations.

In various embodiments, the variables of a machine-learning model may be interrelated in any suitable arrangement in order to generate the output. For example, in some embodiments, the machine-learning model may include image-processing architecture that is configured to identify, isolate, and/or extract features, geometry, and or structure in one or more of optical character recognition data, non-optical in vivo image data, transaction data, metadata, account data, or the like. For example, the machine-learning model may include one or more convolutional neural network ("CNN") configured to identify features in the transaction data, and may include further architecture, e.g., a connected layer, neural network, etc., configured to determine a relationship between the identified features in order to determine a category in the transaction data.

In some instances, different samples of training data and/or input data may not be independent. For example, samples of training data may include transaction data from multiple accounts, as well as data sets from vendors and one or more user accounts. Thus, in some embodiments, the machine-learning model may be configured to account for and/or determine relationships between multiple samples.

For example, in some embodiments, the machine-learning model of the multipartite relay system 102 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of transaction data as input, and generate a sequence of categories, e.g., a path, in the transaction data as output.

Although depicted as separate components in FIG. 1A, it should be understood that a component or portion of a component in the environment 100 may, in some embodiments, be integrated with or incorporated into one or more other components. For example, a display may be integrated into the user device 112 or the like. In another example, the multipartite relay system 102 may be integrated in a data storage system. The data storage system may be configured to communicate and/or receive/send data across electronic network 110 to other components of environment 100. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized to flag a transaction (e.g. deduction) are discussed in further detail in the methods below. In the following methods, various acts may be described as performed or executed by a component from FIG. 1A, such as the multipartite relay system 102, the user device 112, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 1B:
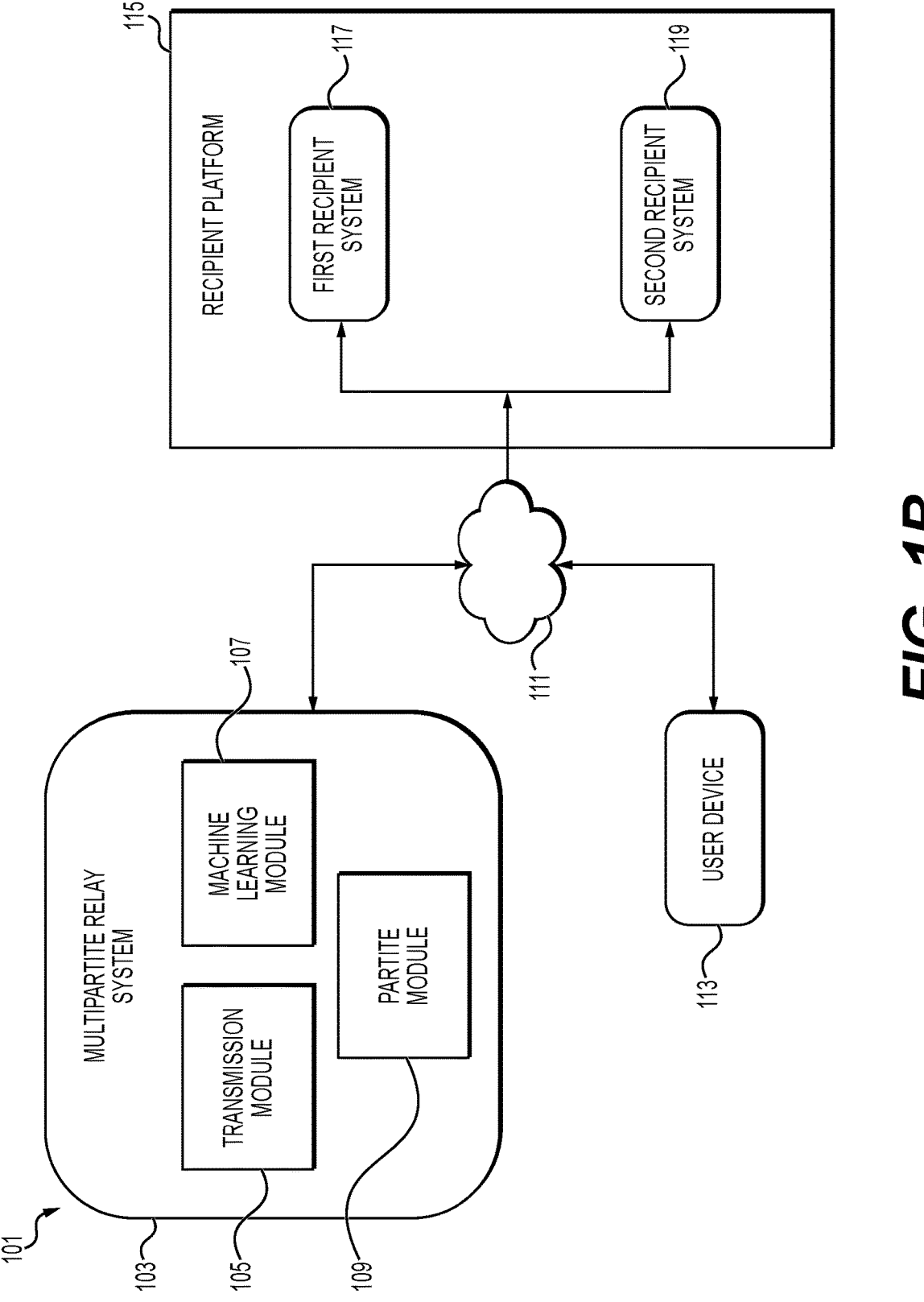
FIG. 1B depicts an exemplary environment for the multipartite relay system and a recipient platform, according to one or more embodiments.

FIG. 1B illustrates an exemplary environment 101 for the multipartite relay system and a recipient platform. Similar to that illustrated in FIG. 1A, FIG. 1B illustrates multipartite relay system 103, including transmission module 105, machine-learning model 107, and partite module 109, as described with respect to FIG. 1A above. As illustrated, exemplary environment 101 may also include user device 113. Components of exemplary environment 101 may interact or communicate with each other via electronic network 111. In comparison with FIG. 1A, FIG. 1B illustrates an embodiment wherein first recipient system 117 and second recipient system 119 may be housed within or implemented using a recipient platform 115. In various implementations, recipient platform 115 may be implemented as a financial system or service, computing application, application programming interface (API), or the like.

According to an embodiment, a single relay amount may be extracted from a sender system and may be received at recipient platform 115. The single relay amount may be received at recipient platform 115 with the allocation policy or a version of the allocation policy (e.g., a version acceptable by recipient platform 115). For example, the multipartite relay system 103 may identify a recipient platform 115 format based on the one or more intended recipients associated with the allocation policy. The multipartite relay system 103 may generate a version of the allocation policy formatted based on the recipient platform 115. Accordingly, multipartite relay system 103 may be configured to generate multiple versions of the allocation policy based on one or more respective recipient platforms 115. The respective version of the allocation policy may be packaged as a packet (e.g., as a payload, header, footer, etc.) and transmitted with or separate from a transmission of the single relay amount to recipient platform 115.

FIG. 2 illustrates a diagram 200 of a splitting of a single relay amount into a first apportioned amount and a second apportioned amount using the exemplary multipartite relay system. As described above, single relay amount 202 may be split by one or more modules or components of multipartite relay system 204 into a first apportioned amount 206 and a second apportioned amount 208.

FIG. 3 illustrates an exemplary process 300 for using the multipartite relay protocol system, such as in the various examples discussed above. At step 305, a multipartite relay request is received. The multipartite relay request may be input by a user (e.g. sender) via a computing device, such as user device 112 depicted in FIG. 1A. The multipartite relay request may include relay data, which includes a single relay amount (e.g. a funds transfer amount) and an allocation policy.

According to an implementation, a user may provide the single relay amount and the allocation policy may be output by a software or allocation machine learning model. An allocation machine learning model may be trained in accordance with techniques disclosed herein (e.g., by modifying one or more weights, layers, nodes, or synapses) based on training data that includes historical allocation policies, historical relay amounts, and/or historical recipients. The historical allocation policies, historical relay amounts, and/or historical recipients may correspond to the user or one or more other users (e.g., a cohort of users). For example, the allocation machine learning model may be trained to generate an allocation policy based on a user's past transactions, other user's transactions, user preferences, a user profile, and/or the like. The allocation machine learning model may output an allocation policy or an update to an allocation policy. For example, the allocation machine learning model may receive, as an input, a single relay amount and/or one or more intended recipients and may output an allocation policy based on the inputs. Alternatively, the allocation machine learning model may determine two or more recipients (e.g., based on training data such as historical allocation policies, historical relay amounts, and/or historical recipients). As discussed herein, the allocation policy may include instructions for how the single relay amount is to be allocated (e.g. divided) to one or more recipients.

In examples, the single relay amount may be a total amount of funds that a sender selects to debit from their account and transfer to two or more recipients. Additionally, the allocation policy may include instructions for how the single relay amount is to be allocated (e.g. divided) to one or more recipients. In examples, the allocation policy may identify a first recipient and a second recipient. In such examples, the allocation policy may identify the first and second recipients by an account number, account identification, user identification, or the like.

At step 310, a relay of the single relay amount is requested by a multipartite relay system, such as multipartite relay system 102 depicted in FIG. 1A. At step 315, the relay of the single relay amount is received. In examples, a master relay identifier (e.g. transaction identifier) is generated as a result of the relay of the single relay amount. In various implementations, the single relay amount may be held by the multipartite relay system before being released for transfer (e.g. such as in escrow). In examples, the relay of the single relay amount is transmitted through an automated clearing house (ACH) up to a maximum of one time. In other words, the disclosed systems and methods provide a way for a single funds transfer to be split and allocated between multiple recipients, without a need to initiate a separate transfer for each recipient. In various implementations, the relay of the single relay amount may be received at a recipient platform that includes a plurality of recipient systems. The relay may therefore identify a first recipient system, of the plurality of recipient systems, that is associated with first recipient and a second recipient system, of the plurality of recipient systems that is associated with second recipient.

At step 320, the single relay amount is split into a first apportioned amount and a second apportioned amount according to the allocation policy of the multipartite relay request. At step 325, the first apportioned amount is transmitted into a first recipient system of a first recipient and the second apportioned amount is transmitted into a second recipient system of a second recipient. In examples, a first recipient relay identifier (e.g. transaction identifier) is generated for the first apportioned amount and a second recipient relay identifier is generated for the second apportioned amount.

FIG. 4 illustrates another exemplary process 400 for using the multipartite relay protocol system, e.g., by utilizing a trained comparison machine-learning model such as a machine-learning model trained according to one or more embodiments discussed above, such as those discussed with respect to FIG. 1A. At step 405, a category identifier of a deduction against the first apportioned amount is determined. At step 410, the category identifier is compared by a machine-learning model with each of one or more category identifiers of the allocation policy. At step 415, the deduction may be flagged by the machine-learning model based upon the category identifier not matching any one of the one or more category identifiers of the allocation policy.

As disclosed herein, one or more implementations disclosed herein may be applied by using a machine learning model. A machine learning model as disclosed herein may be trained using one or more components or steps of FIGS. 1A-4. As shown in flow diagram 500 of FIG. 5, training data 512 may include one or more of stage inputs 514 and known outcomes 518 related to a machine learning model to be trained. The stage inputs 514 may be from any applicable source including a component or set shown in the figures provided herein. The known outcomes 518 may be included for machine learning models generated based on supervised or semi-supervised training. An unsupervised machine learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a trained machine learning model 550. According to an implementation, the training component 530 may be provided with comparison results 516 that compare a previous output of the corresponding machine learning model to apply the previous result to re-train the machine learning model. The comparison results 516 may be used by the training component 530 to update the corresponding machine learning model. The training algorithm 520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 500 may be a trained machine learning model 550.

A machine learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine learning model (e.g., a trained model) based on the training. Once trained, the machine learning model may output machine learning model outputs in accordance with the subject matter disclosed herein. According to an implementation, one or more machine learning models disclosed herein may continuously update based on feedback associated with use or implementation of the machine learning model outputs.

It should be understood that embodiments in this disclosure are exemplary only, and that other embodiments may include various combinations of features from other embodiments, as well as additional or fewer features. For example, while some of the embodiments above pertain to multipartite relay, any suitable activity may be used.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

FIG. 6 is a simplified functional block diagram of a computer 600 that may be configured as a device for executing the methods disclosed here, according to exemplary embodiments of the present disclosure. For example, the computer 600 may be configured as a system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the disclosed subject matter, various features of the disclosed subject matter are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed matter requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the disclosed subject matter.

Furthermore, while some embodiments described herein include some but not other features included in other embodiments, combinations of features of different embodiments are meant to be within the scope of the disclosed subject matter, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosed subject matter, and it is intended to claim all such changes and modifications as falling within the scope of the disclosed subject matter. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
receiving, from a multipartite relay system, a multipartite relay request comprising relay data, the relay data comprising a single relay amount, financial account, and an allocation policy, the allocation policy identifying a first recipient platform and a second recipient platform;
converting the received multipartite relay request into a first request having a first format accepted by the first recipient platform and a second request having a second format accepted by the second recipient platform;
requesting, by one or more processors of the multipartite relay system, a relay of the single relay amount using the converted first and second relay requests;
receiving, by the one or more processors, the relay of the single relay amount;
in response to receiving the relay of the single relay amount, splitting, by the one or more processors, the single relay amount into a first apportioned amount and a second apportioned amount according to the allocation policy of the multipartite relay request; and
transmitting, by the one or more processors, the first apportioned amount with the first request into a first recipient system of a first recipient and the second apportioned amount with the second request into a second recipient system of a second recipient.

2. The computer-implemented method of claim 1, wherein a master relay identifier is generated as a result of the relay of the single relay amount.

3. The computer-implemented method of claim 1, wherein a first recipient relay identifier is generated for the first apportioned amount and a second recipient relay identifier is generated for the second apportioned amount.

4. The computer-implemented method of claim 1, wherein the multipartite relay system is implemented as a software module configured to run on a user device.

5. The computer-implemented method of claim 1, wherein the relay of the single relay amount is transmitted through an automated clearing house (ACH) up to a maximum of one time.

6. The computer-implemented method of claim 1, further comprising:
determining, by the one or more processors, a category identifier of a deduction against the first apportioned amount;
comparing, by a machine learning model, the category identifier with each of one or more category identifiers of the allocation policy; and
flagging, by the machine learning model, the deduction based upon the category identifier not matching any one of the one or more category identifiers of the allocation policy.

7. A computer-implemented method comprising:

receiving, from a multipartite relay system, a multipartite relay request comprising relay data, the relay data comprising a single relay amount;

providing the multipartite relay request to an allocation machine learning model trained by modifying one or more weights, layers, nodes, or synapses based on training data comprising historical allocation policies, historical relay amounts, and historical recipients;

receiving an allocation policy as an output of the allocation machine learning model, wherein the allocation policy identifies a recipient platform implemented by a first recipient and a second recipient;

formatting the allocation policy to generate an allocation version for a first recipient platform of the first recipient and an allocation version for the second recipient platform of the second recipient;

requesting, by one or more processors of the multipartite relay system, a relay of the single relay amount;

receiving, by the one or more processors, the relay of the single relay amount at the recipient platform comprising a plurality of recipient systems, wherein the relay identifies a first recipient system, of the plurality of recipient systems, associated with first recipient, and a second recipient system, of the plurality of recipient systems, associated with second recipient;

in response to receiving the relay of the single relay amount, packaging, by the one or more processors, the single relay amount into a first package comprising a first apportioned amount and the allocation version for the first recipient platform and a second package comprising a second apportioned amount and the allocation version for the second recipient platform; and transmitting, by the one or more processors, the first package to the first recipient system and the second package to the second recipient system.

8. The computer-implemented method of claim 7, wherein a master relay identifier is generated as a result of the relay of the single relay amount.

9. The computer-implemented method of claim 7, wherein a first recipient relay identifier is generated for the first apportioned amount and a second recipient relay identifier is generated for the second apportioned amount.

10. The computer-implemented method of claim 7, wherein the multipartite relay system is implemented as a software module configured to run on a user device.

11. The computer-implemented method of claim 7, wherein the relay of the single relay amount is transmitted through an automated clearing house (ACH) up to a maximum of one time.

12. The computer-implemented method of claim 7, further comprising:

determining, by the one or more processors, a category identifier of a deduction against the first apportioned amount;

comparing, by a comparison machine learning model, the category identifier with each of one or more category identifiers of the allocation policy; and flagging, by the comparison machine learning model, the deduction based upon the category identifier not matching any one of the one or more category identifiers of the allocation policy.

13. A multipartite relay system comprising:
a memory storing instructions; and
a processor operatively connected to the memory and configured to execute the instructions to perform operations including:

receiving, from the multipartite relay system, a multipartite relay request comprising relay data, the relay data comprising a single relay amount, a financial account, and an allocation policy, the allocation policy identifying a first recipient platform and a second recipient platform;

converting the received multipartite relay request into a first request having a first format accepted by the first recipient platform and a second request having a second format accepted by the second recipient platform;

requesting, by one or more processors of the multipartite relay system, a relay of the single relay amount using the converted first and second relay requests;

receiving, by the one or more processors, the relay of the single relay amount;

in response to receiving the relay of the single relay amount, splitting, by the one or more processors, the single relay amount into a first apportioned amount and a second apportioned amount according to the allocation policy of the multipartite relay request;

transmitting, by the one or more processors, the first apportioned amount with the first request into a first recipient system of a first recipient and the second apportioned amount with the second request into a second recipient system of a second recipient using the formatted allocation policy.

14. The multipartite relay system of claim 13, wherein a master relay identifier is generated as a result of the relay of the single relay amount.

15. The multipartite relay system of claim 13, wherein a first recipient relay identifier is generated for the first apportioned amount and a second recipient relay identifier is generated for the second apportioned amount.

16. The multipartite relay system of claim 13, wherein the multipartite relay system is implemented as a software module configured to run on a user device.

17. The multipartite relay system of claim 13, wherein the relay of the single relay amount is transmitted through an automated clearing house (ACH) up to a maximum of one time.

18. The multipartite relay system of claim 13, wherein the operations further include:

determining, by the one or more processors, a category identifier of a deduction against the first apportioned amount;

comparing, by a machine learning model, the category identifier with each of one or more category identifiers of the allocation policy; and flagging, by the machine learning model, the deduction based upon the category identifier not matching any one of the one or more category identifiers of the allocation policy.

19. The multipartite relay system of claim 13, wherein the multipartite relay system comprises a transmission module configured to request the relay of the single relay amount.

20. The multipartite relay system of claim 13, wherein the multipartite relay system comprises a partite module configured to split the single relay amount into the first apportioned amount and the second apportioned amount according to the allocation policy of the multipartite relay request.

* * * * *